D. B. ROGERS.

Cultivator-Teeth.

No. 1,274. Reissued Feb. 11, 1862.

N. PETERS, PHOTO-LITHOGRAPHER, WASHINGTON, D. C.

UNITED STATES PATENT OFFICE.

DAVID B. ROGERS, OF ALLEGHENY, PENNSYLVANIA.

IMPROVEMENT IN CULTIVATOR-TEETH.

Specification forming part of Letters Patent No. 4,245, dated November 1, 1845; Reissue No. 815, dated September 20, 1859; Reissue No. 1,274, dated February 11, 1862.

*To all whom it may concern:*

Be it known that I, DAVID B. ROGERS, formerly of Stafford, in the State of New York, now of the city of Allegheny, in the county of Allegheny and State of Pennsylvania, have invented a new and useful Improvement in Cultivator-Teeth; and I do hereby declare that the following is a full, clear, and exact description thereof, reference being had to the annexed drawings, forming part of this specification, in which—

Figure 1:
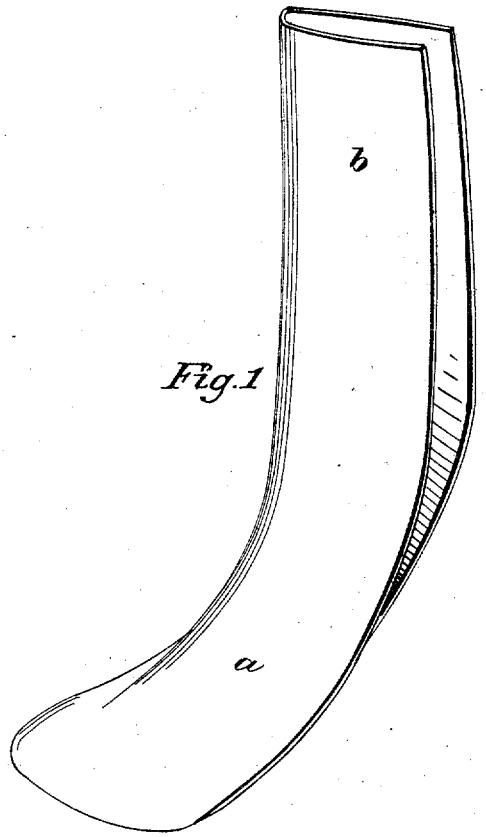
Figure 2:
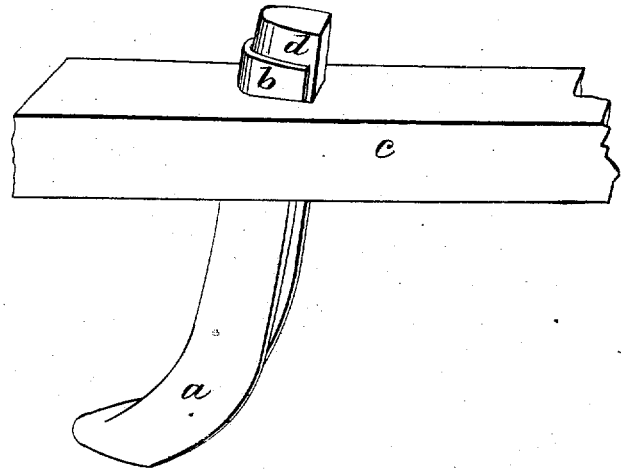

Figure 1 is a perspective representation of one of my improved cultivator-teeth separated from the cultivator-frame. Fig. 2 is a representation of one of my improved teeth as attached to the beam and ready for use.

Previous to the date of my invention cultivator-teeth were usually made of wrought or cast iron, with a solid shank or standard, so as to afford the requisite degree of strength and firmness to resist the pressure it is subjected to when in use. They were also sometimes made with the shank or upper part of cast or wrought iron and the operative part or foot of steel fastened to the shank by riveting, bolting, or welding, as the case might be. The teeth made in any of the modes just mentioned were liable to the serious objections that they were very heavy, owing to the weight of metal in the solid shank necessary to give the requisite strength, and in case of the teeth with steel feet, when welded on, that they could not be readily made as smooth as was desirable, and required a great deal of work to construct them. The mode of attaching them to the frame by nuts and washers previously used, was troublesome, and required extra work to shape the upper end of the solid shank so as to adapt it for attachment to the frame. To obviate these objections and secure at the same time a lighter and more desirable tooth, I conceived the idea of making the entire tooth of a single thin plate of steel. The chief difficulty to be overcome in using steel plate for the whole tooth was to obviate the necessity of a solid shank and secure the requisite degree of strength and firmness in that part of the tooth, and at the same time admit of its being easily and securely attached to the beam of the cultivator. This I have accomplished in the manner hereinafter described; and to enable others skilled in the art to make and use my improved cultivator-teeth will proceed to describe their construction and operation.

Cultivator-teeth consist of two principal parts—the lower or operative part, (marked *a* in the drawings,) which I call the "foot," and the upper part, which I call the "shank," (marked *b*,) being that part between the foot and the beam, as well as the part inserted in the beam. These parts are not in my tooth separated at all, but run into each other, the whole tooth being made of one piece, and the distinction is only made for the purpose of description.

In making my improved teeth I take a piece or thin plate of steel of suitable dimensions. The foot of the tooth I cut of the ordinary shape, making it thinner, however, than cast or wrought iron teeth are made, owing to the superior strength and resistance of the material which I employ. At the upper part of the shank the steel plate is curved in front, so as to be semi-tubular or U-shaped, the curvature of the plate being continued until the edges of the plate are either parallel to each other, as shown at the top of the shank in Fig. 1; or, if preferred, the edges may be brought nearer together, so as to be almost if not quite tubular, though this is immaterial, as the exact U shape shown in the drawings is all that is necessary to secure the desired result, which is to give to the thin steel shank the staunchness and rigidity of a solid shank. The degree of curvature of the shank shown at the top in Fig. 1 may be continued downward for some distance toward the foot, where it gradually flares or opens until the U shape is lost in the curvature given to the lower part of the shank and foot, as shown in the drawings. Thus the whole of the tooth, both shank and foot, is made of one piece of steel, which may be formed at one operation into the required shape by means of suitable dies. The shape thus given to the shank may be used for cultivator-teeth, no matter in what way they are fastened to or secured in the beam of the cultivator; but by continuing the shank upward of the same shape, either U-shaped or more nearly approaching a tubular conformation sufficiently to allow it to pass through the beam of the cultivator, I am enabled to dispense with the use of any separate standard or bolt, with nuts, &c., for attaching it to the frame. This I effect by making a mortise or hole in the beam *c* (see Fig. 2) of a similar size and shape to the upper end of the shank, and passing the shank up through this mortise in the beam sufficiently far to give it a good bearing. A wedge or key, *d*, (see Fig. 2,) is then driven downward into the cavity of the shank, which, forcing the sides of the steel shank outward in all directions against the sides of the mortise in the beam, tightens and firmly secures it in its place.

This mode of attaching the tooth to the beam of the cultivator is very simple, and gives great firmness and stability to the tooth, and permits it to be easily removed or shifted up or down, so as to make the tooth below the beam longer or shorter, as may be desired; but it is not essential to the use of my improved tooth, which may be used, if desired, with any other mode of attachment to the shank, in which case the U shaped end or top of the shank may be made to rest against the under side of the beam, and the tooth attached by means of a collar, standard, or other device in any convenient manner.

The great advantage of my improvement in cultivator-teeth is that it enables them to be made entirely of steel and all in one piece, as described, the steel teeth being much smoother and working more easily in the ground than wrought or cast iron teeth, or even than teeth made with a steel foot and cast or wrought iron shank. These teeth are also much lighter and more durable, which is a great advantage to the farmer, while their simplicity of shape and construction saves a great deal of work in their manufacture.

Having thus described my improvement in cultivator-teeth, what I claim as my invention, and desire to secure by Letters Patent, is—

1. Making cultivator-teeth entirely of thin plate steel, the shank or upper part being bent or curved round in front, substantially as hereinbefore described, and for the purposes set forth, irrespective of the mode of attaching the tooth to the beam.

2. Attaching cultivator-teeth to the cultivator-frame by inserting the upper end of the shank (curved round in front for that purpose) into a suitable hole in the beam and driving a key or wedge into the cavity of the tooth, thereby pressing the shank against the sides and front of the hole in the beam, and thus securing it in its place.

In testimony whereof I, the said DAVID B. ROGERS, have hereunto set my hand this 30th day of November, A. D. 1859.

DAVID B. ROGERS.

In presence of—
MARTIN G. CUSHING,
AND. MCMASTER.